April 10, 1956 R. C. MILES 2,741,097
AUTOMATIC REFRIGERATOR CONTROL
Filed Nov. 29, 1952
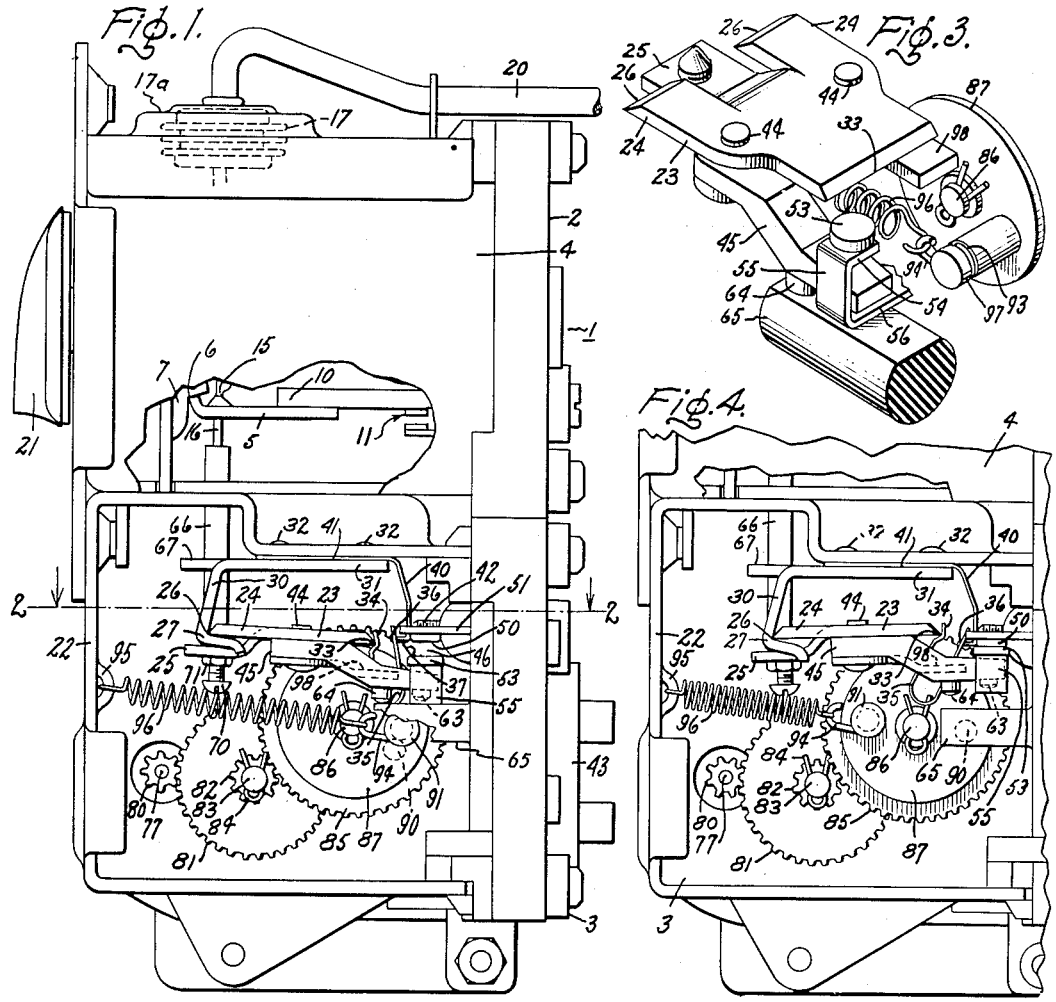
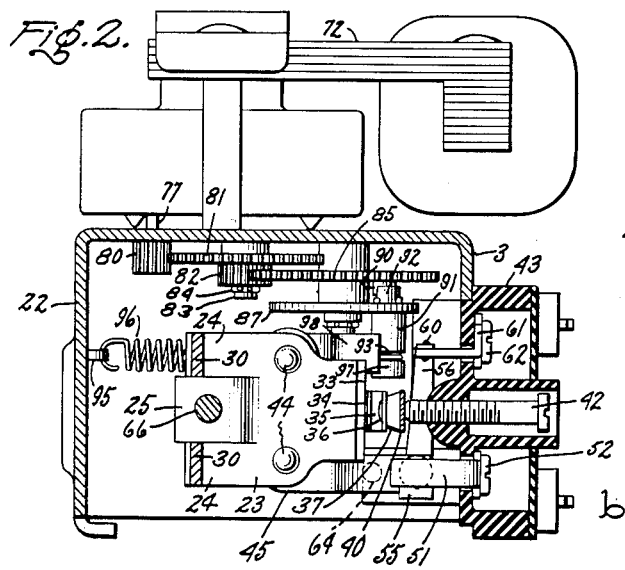
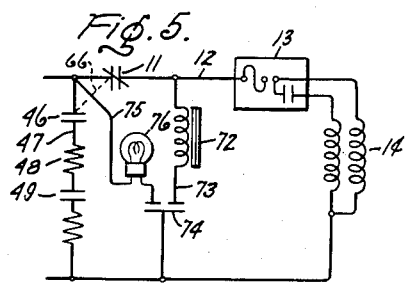
Inventor
Roscoe C. Miles
by
His Attorney

United States Patent Office 2,741,097
Patented Apr. 10, 1956

2,741,097

AUTOMATIC REFRIGERATOR CONTROL

Roscoe C. Miles, Erie, Pa., assignor to General Electric Company, a corporation of New York Application November 29, 1952, Serial No. 323,197

7 Claims. (Cl. 62—4)

My invention relates to refrigeration apparatus and pertains more particularly to automatic refrigerator controls including means for initiating defrosting operations.

The primary object of my invention is to provide a new and improved automatic refrigerator control including means for initiating defrosting operations.

Another object of my invention is to provide an improved automatic refrigerator control including means for initiating defrosting operations as a function of refrigerator door open time during unit motor running time.

Still another object of my invention is to provide in an automatic refrigerator control including means for initiating defrosting operations as a function of door open time during unit motor running time, means for adjustably determining the duration of the defrosting operation.

Further objects and advantages of my invention will become apparent as the following description proceeds and the features of novelty which characterize my invention will be pointed out with particularity in the claims annexed to and forming part of this specification.

In carrying out the object of my invention, I provide a refrigerator control including a first member movable between a unit motor energizing position and a unit motor deenergizing position and temperature responsive means for determining the position of the first member. I provide further a second member movable between a defrost heater energizing position and a defrost heater deenergizing position. An interponent between the first and second members positions the second member in its heater deenergizing position when the first member is in its unit motor energizing position. A timing motor which is energized only when the refrigerator door is open and the unit motor is operating is effective after a predetermined cumulative amount of running time for effecting movement of the second member from the heater deenergizing position to the heater energizing position. When the second member is in its heater energizing position the interponent positions the first member in its unit motor deenergizing position. At a predetermined temperature, the temperature responsive means returns the first member to its unit motor energizing position. Adjustable biasing means cooperates with the second member and through the interponent determines the temperature at which the first member is returned.

For a better understanding of my invention, reference may be had to the accompanying drawing in which:

Fig. 1 is an enlarged partially broken away side elevation view of the device of my invention;

Fig. 2 is a section taken along the line 2—2 in Fig. 1 and looking in the direction of the arrows;

Fig. 3 is an enlarged perspective view of the second operating arm illustrating the same in its heater deenergizing position;

Fig. 4 is a fragmentary view of the device of my invention illustrating the second operating arm in its heater energizing position; and Fig. 5 is a wiring diagram illustrating the circuits controlled by the device of my invention.

In Fig. 1 I have shown a refrigerator control generally designated 1. The control 1 comprises a refrigerating unit cycling control 2 and a defrost control 3. The unit cycling control 2 is provided for determining the operation of the motor in the refrigerating unit and thereby maintaining the evaporator in the refrigerating system in which the control 1 is employed at a predetermined low temperature. The defrost control 3 is provided for initiating defrosting operations to melt frost formed in the refrigerator.

The unit cycling control 2 as such is not my invention but is the joint invention of Robert L. Gray and Charles S. Grimshaw and is disclosed and claimed in their copending application Serial No. 239,338, filed July 30, 1951, now Patent 2,658,121, and assigned to the same assignee as the present invention. Accordingly, a full showing and description of the unit cycling control 2 is not herein necessary, it being sufficient merely to describe briefly the operation of the control 2 and the several elements therein which render it adaptable for combination with the defrost control 3 to arrive at the refrigerator control 1.

The unit cycling control 2 includes a housing 4 in which is located a first member or operating arm 5. One end of the operating arm 5 engages in a reentrant portion 6 of a fixed bracket 7 whereby the operating arm 5 is adapted for pivotal movement between an "up" and a "down" position. An insulative member 10 carried on the end of the operating arm 5 opposite the bracket 7 cooperates with a pair of contacts symbolically shown in Fig. 5 and designated 11. The contacts 11 control a circuit 12 which includes an overload switch 13 and the motor 14 of the refrigerating unit in the system employing the control 1. When the operating arm 5 is in its "down" position, the insulative member 10 closes the contacts 11 as symbolically shown in Fig. 5, and the refrigerating unit motor 14 is energized or operated. When the operating arm 5 is in its "up" position, the insulative member 10 opens the contacts 11 and the refrigerating unit motor 14 is deenergized or becomes idle.

Cooperating with the operating arm 5 is a pin 15. The pin 15 passes through the operating arm 5 adjacent the bracket 7 and includes a portion 16 which engages the underside of the operating arm. A compressed coil spring (not shown) carried on the pin 15 engages a portion of the pin and biases the pin upwardly whereby the operating arm 5 is biased to the "up" position thereof for opening the contacts 11 and de-energizing the refrigerating unit motor 14. A toggle spring (not shown) tends to bias the operating arm 5 to its "down" position for closing the contact 11 and energizing the refrigerating unit motor 14. However, the toggle spring is weaker than the compressed coil spring and is effective for moving the operating arm 5 from the "up" position to the "down" position only when the biasing effect of the coil spring is overcome.

Provided for determining the position of the operating arm 5 by cooperating with the pin 15 to determine whether or not the biasing effect of the coil spring will be overcome is a temperature responsive means or bellows 17 which is shown in outline and is located in the portion of the housing 4 designated 17a. The bellows is connected by a tube 20 to a volatile fluid containing bulb (not shown) which is maintained in heat exchange relationship with the evaporator in the system. When the refrigerating unit motor 14 is deenergized or idle, the evaporator in the system becomes heated and in response thereto the fluid in the bulb expands resulting in expansion of the bellows 17. When the evaporator attains a predetermined maximum normal operating temperature which by way of example might be 15° F., expansion of the bellows 17 is such as to exert a force on the pin 15 sufficient to overcome the biasing effect of the coil spring on the pin 15 and the operating arm 5. When the biasing effect of the coil spring is overcome in this manner, the toggle spring is effective for biasing the operating arm 5 to its "down" position whereby the contacts 11 are closed. With the contacts 11 closed, the refrigerating unit motor 14 is energized and the unit is effective for lowering the temperature of the evaporator toward the predetermined minimum temperature which by way of example might be 5° F. When the temperature of the evaporator falls to the predetermined minimum, the volatile fluid in the bulb contracts resulting in contraction of the bellows 17. With contraction of the bellows the coil spring overcomes the weaker toggle spring and biases the operating arm 5 to its "up" position whereby the contacts 11 are opened and the refrigerating unit motor 14 is deenergized. It will be seen that by operating the refrigerating unit motor 14 intermittently and in accordance with the temperature of the evaporator in the just described manner, the temperature of the evaporator may be maintained at a substantially constant predetermined low temperature.

The predetermined low temperature to be maintained by the cycling control 2 may be adjustably varied by adjusting the biasing effect of the coil spring on the pin 15 and the operating arm 5. This is effected by manipulating an adjustment knob 21 through which a camming arrangement (not shown) adjusts the compression of the coil spring. Turning the knob 21 in one direction increases the compression of the coil spring which in turn increases the force required to be exerted on the pin 15 by the expanding bellows for overcoming the biasing effect of the coil spring. This lengthens the idle or deenergized periods of the refrigerating unit motor 14 and causes the evaporator to operate at a higher temperature. Turning the knob 21 oppositely decreases the compression of the coil spring which in turn decreases the force required to be exerted on the pin 15 by the expanding bellows for overcoming the biasing effect of the coil spring. This shortens the idle or deenergized periods of the refrigerating unit motor 14 and causes the evaporator to operate at a lower temperature.

The defrosting control 3 includes a housing 22 suitably secured to the underside of the housing 4 of the unit cycling control 2. As seen in Figs. 1 and 2, the defrosting control 2 includes a second member or operating arm 23. One end of the second operating arm 23 is formed to include a pair of spaced portions 24 and a portion 25 bent downwardly out of the plane of the operating arm intermediate the spaced portions 24. As perhaps better seen in Fig. 3, the spaced portions 24 of the second operating arm 23 are each formed with a knife-edge 26. The knife-edges 26 engage in reentrant portions 27 of a corresponding pair of pendent arms 30 formed off a bracket 31 secured as by a pair of rivets 32 to the upper side of the housing 22.

Formed on the end of the second operating arm 23 opposite the knife-edges 26 is another knife-edge 33. The knife-edge 33 engages in a reentrant portion 34 formed on one leg of a U-shaped toggle spring 35. For a purpose which will be seen hereinafter, the U-shaped toggle spring 35 is stronger than the toggle spring (not shown) associated with the first operating arm 5. The other leg of the toggle spring 35 is formed with an elongated depression or seat 36 for receiving an edge 37 formed off a pendent arm 40 of a resilient member 41. The resilient member 41 is secured by the rivets 32 between the bracket 31 and the upper side of the housing 22. By this arrangement the second operating arm 23 is adapted for pivotal movement about the knife-edges 26 between the "down" position thereof shown in Fig. 1 and the "up" position shown in Fig. 4. Additionally, the toggle spring 35 biases the second operating arm 23 in either its "up" or "down" positions. The force with which the toggle spring 35 biases the operating arm 23 in these positions may be adjustably varied by turning an adjustment screw 42 adapted for cooperating with the pendent arm 40 of the resilient member 41. The adjustment screw 42 is threaded into an insulative terminal housing 43 suitably secured to one side of the housing 22. Turning of the adjustment screw 42 in one direction advances the screw inwardly whereby the pendent arm 40 of the resilient member 41 is moved inwardly. Thus, the legs of the toggle spring 35 are moved closer together and the tension in the toggle spring is increased whereby the force with which the toggle spring 35 biases the second operating arm 23 is increased. By turning the adjustment screw 42 oppositely or outwardly, the pendent arm 40 is permitted to move outwardly whereby the tension in the toggle spring 35 is relieved and the biasing effect of the toggle spring on the second operating arm 23 is decreased.

Secured to the second operating arm 23 by means of a pair of rivets 44 is an insulative arm 45. The insulative arm 45 is provided for cooperating with a pair of contacts generally designated 46. As seen in Fig. 5, the contacts 46 control a circuit 47 connected in parallel with the refrigerating unit motor circuit 12. Included in the circuit 47 is a defrost heater 48 and a thermostatic switch 49 adapted for protecting the heater 48 from overheating. The pair of contracts 46 includes a first contact button 50 which is secured on the underside of a terminal arm 51. The terminal arm 51 passes through and is suitably secured to the insulative housing 43. A screw 52 threads into the terminal arm 51 on the exterior side thereof and is adapted for electrically connecting one side of the circuit 47 to the terminal arm. The second contact button 53 is carried on the upper or outer side of a portion 54 of a resilient contact arm 55. The portion 54 is spaced from and bent back upon a main portion 56 of the contact arm 55. The extremity of the main portion 56 is electrically connected as at 60 to a terminal arm 61. The terminal arm 61 passes through and is suitably secured to the insulative housing 43. A screw 62 threaded into the exterior side of the terminal arm 61 is provided for electrically connecting the terminal arm 61 in the circuit 47.

The extremity of the insulative arm 45 is adapted for being disposed between the bent back portion 54 and the main portion 56 of the resilient arm 55. When the second operating arm 23 is in its "down" position, in the manner shown in Fig. 1, a button 63 formed off the underside of the insulative arm 45 engages the main portion 56 of the resilient contact arm 55 and depresses it whereby the contact buttons 50 and 53 are separated. Downward movement of the insulative arm 45 is limited by engagement of another button 64 formed off the insulative arm with an inwardly projecting lug 65 formed off the insulative housing 43. Separating the contact buttons 50 and 53 in the just described manner results in the circuit 47 being broken and the defrost heater 48 being deenergized. When the second operating arm 23 is in its "up" position, in the manner shown in Fig. 4, the insulative arm 45 engages the underside of the bent back portion 54 of the resilient contact arm 55 and holds the contact buttons 50 and 53 engaged or closed. With the contact buttons 50 and 53 closed, the circuit 47 is completed and the defrost heater 48 is energized.

The defrosting operation consists of energizing the defrost heater 48 while simultaneously deenergizing the unit motor 14. Provided for effecting deenergization of the unit motor 14 when the second operating arm 23 is in its "up" or defrost heater energizing position is an interponent 66. The interponent 66 is positioned between the lower end of the pin 15 and the downwardly bent center portion 25 of the second operating arm 23. The interponent 66 passes slidingly through suitable apertures in the adjacent bottom and top sides of the attached houses 4 and 22. Additionally, the interponent 66 passes slidingly through an aperture formed in a horizontally extending portion 67 of the above-mentioned bracket 31. Thus, the interponent 66 is arranged for guided vertical movement. The upper end of the interponent 66 engages the lower end of the pin 15 and the lower end of the interponent engages the end of an adjusting screw 70 threaded into the above-mentioned center portion 25 of the operating arm 23. Carried on the adjusting screw 70 for securing adjustments made to the interponent is a lock nut 71.

The interponent 66 provides a coaction between the first and second operating arms 5 and 23, respectively, which is such that the movement of the first operating arm 5 between its "up" and "down" positions for controlling the operation of the refrigerating unit motor 14 is not interfered with until the second operating arm 23 is moved to its "up" position for energizing the defrost heater 48. That is, when the second operating arm 23 is in its "down" or defrost heater deenergizing position, the first operating arm 5 is free to move under the influence of the temperature responsive bellows between its "up" and "down" positions for controlling the operation of the unit motor and, therefore, the temperature of the evaporator. However, when the second operating arm 23 is driven into its "up" or defrost heater energizing position, in a manner to be described in detail hereinafter, the interponent 66 effectively positions the first operating arm 5 in its "up" or unit motor deenergizing position and through the second operating arm and the interponent the stronger U-shaped toggle spring 35 maintains the first operating arm in its "up" position. Conversely, when both the first and second operating arms 5 and 23, respectively, are in their "up" positions the return of the first operating arm 5 to its "down" position results in the interponent 66 positioning the second operating arm 23 in its "down" position.

Provided for determining the operation of the second operating arm 23 is an electric timing motor 72. As seen in Fig. 5, the timing motor 72 is included in a circuit 73 which is so connected across the leads of the refrigerating unit motor 14 as to be controlled by the contacts 11. The circuit 73 includes a switch 74 adapted for being operated by refrigerator door openings. The switch 74 may also be employed for controlling a circuit 75 which is in parallel with the current supply circuit ahead of the contacts 11 and includes a lamp 76 for illuminating the interior of the refrigerator. Opening of the refrigerator door closes the switch 74. This energizes the lamp 76 under all conditions but completes a circuit through the timing motor 72 to energize same only if and when the contacts 11 controlling the unit motor 14 are closed. If the unit motor controlling contacts 11 are open no power will be supplied to either the unit motor 14 or the timing motor 72 and, consequently, closing of the switch 74 by door openings will be ineffective for energizing the timing motor 72.

The timing motor 72 is suitably mounted exteriorly on one side of the housing 22 of the defrost control 2. The timing motor 72 includes a main shaft 77 which projects through the side of the housing 22. Carried fixedly on the main shaft 77 within the housing 22 is a first pinion 80. The first pinion 80 meshes with and drives a first gear 81 clockwise in Figs. 1 and 4. The first gear 81 and a second pinion 82 are rotatably mounted on a stud 83 and are retained on the stud by a cotter pin 84. The first gear 81 and the second pinion 82 are suitably secured together and, consequently, the second pinion 82 rotates with the first gear when the latter is driven by the first pinion 80. The second pinion 82 drives counterclockwise in Figs. 1 and 4 a second or ultimate gear 85 mounted rotatably on a second stud 86. The first pinion 80, the first gear 81, the second pinion 82 and the second gear 85 constitute a train of reduction gears. Mounted rotatably on the second stud 86 also and suitably spaced apart from the second gear 85 is a rotatable member or plate 87. The second gear 85 carries a lug 90 projecting toward the plate 87. A stud 91 suitably fitted and retained in the plate 87 includes a lug portion 92, which projects through the plate toward the second gear 85 and is adapted to be engaged by the lug 90 carried on the second gear. In the arrangement described to this point, energization of the timing motor 72 rotates the shaft 77 and the pinion 80. The pinion 80 drives the first gear 81 and the second pinion 82 secured to the first gear drives the second gear 85. Rotation of the second gear 85 causes the lug 90 carried on the second gear to engage and push the lug portion 92 of the stud 91 fitted in the plate 87. Thus, rotation of the second gear 85 causes angular displacement or rotation of the rotatable plate 87.

Carried on the stud 91 in a peripheral groove 93 is a hook 94. Extending between the hook 94 and a loop 95 bent inwardly out of a side of the housing 22 is a coil spring 96. At two times during the operation of the control, namely when the second operating arm 23 is in its "up" position in the manner shown in Fig. 4 and just after the second operating arm is returned to the "down" position of Fig. 1, the lug 90 on the second gear 85 and the stud 91 are diametrically opposed and there is relatively little tension in the spring 96. However, energization of the timing motor 72 as effected by repeated door openings during energization of the unit motor 14 results in rotation of the second gear 85 which eventually brings the lug 90 into engagement with the lug portion 92 of the stud 91. Further energization of the timing motor 72 as effected by additional door openings during unit motor running time causes the lug 90 to push the lug portion 91 and thereby angularly displace the rotatable plate 87. In this manner the plate 87 and the stud 91 are eventually displaced to the position shown in Fig. 1 and the spring 96 is stretched or tensioned. Displacement of the plate 87 beyond the point shown in Fig. 1 as caused by a complete counterclockwise revolution of the second gear 85 from the position thereof in Fig. 4 results in the spring 96 snapping the plate 87 and the stud 91 to the position of Fig. 4.

The portion of the stud 91 opposite the lug portion 92 and indicated by 97 constitutes a hammer. The hammer 97 is adapted for cooperating with an anvil 98 also secured to the second operating arm 23 by the rivets 44. When the second operating arm 23 is in its "down" position the anvil 98 is disposed in the path of travel of the hammer 97. Therefore, when the second operating arm 23 is in its "down" position, and when the plate 87 is snapped from the position thereof in Fig. 1 to the position in Fig. 4 the hammer 97 engages the anvil 98 and drives the second operating arm 23 from its "down" position into its "up" position. With the second operating arm 23 in its "up" position the contacts 46 are closed and the defrost heater 48 is energized.

Additionally, when the second operating arm 23 is in its "up" position the interponent 66 positions the first operating arm 5 in its "up" or unit motor deenergizing position, this being possible since the toggle spring 35 is stronger than the toggle spring which holds the first operating arm 5 in its "down" or unit motor energizing position. The first operating arm will remain in its "up" position so long as the second operating arm 23 is in its "up" position. Thus the control 1 initiates defrosting operation as a function of cumulative refrigerator door open time during unit motor running time.

I have found that in average ambient temperature and humidity conditions satisfactory defrosting is obtained when the control 1 is adapted for initiating a defrosting operation following every 6¼ minutes of cumulative door open time during unit motor running time. This time factor could, of course, be decreased or increased to cope with frosting resulting from other than average temperature and humidity conditions.

During the just described defrosting operation the evaporator in the system becomes heated resulting in melting of the frost thereon and expansion of the bellows 17 in the unit cycling control 2. At a predetermined temperature which by way of example might be 55° F. but which actually depends both on the setting of the adjustment knob 21 and the adjustment of the toggle spring 35, the expanding bellows exerts a force on the pin 15 sufficient to overcome both the compressed coil spring biasing the pin 15 and the first operating arm 5 upwardly and the U-shaped toggle spring 35. When the coil spring and the toggle spring are both overcome in this manner, the first operating arm 5 is returned to its "down" position by the toggle spring associated therewith for resuming operation of the unit motor 14 and the interponent 66 positions the second arm 23 in its "down" position for deenergizing the defrost heater 48. Thus, the defrost operation is terminated, its duration being determined by the force with which the toggle spring 35 biases the second operating arm 23 to its "up" position.

Summarizing the operation of the control 1, the first operating arm 5 normally moves alternately under the influence of the temperature responsive bellows 17 between a "down" or unit motor energizing position and an "up" or unit motor deenergizing position. Thus the unit motor is operated intermittently for maintaining the evaporator temperature in the range of 5° F. to 15° F. When the first operating arm 5 is in its "down" position for closing the unit motor controlling contacts 11 and energizing the unit motor, the interponent 66 effectively positions the second operating arm 23 in its "down" position for maintaining open the defrost heater contacts 46 to deenergize the heater 48. Thereafter, when the refrigerator door is opened the switch 74 is closed and since the contacts 11 are closed the timing motor 72 is energized for a period corresponding in duration to the time the door remains open. Energization of the timing motor 72 causes rotation of the gear 85 which is the ultimate gear in a train of reduction gears. Rotation of the gear 85 causes the lug 90 thereon to engage the lug portion 92 of the stud 91 on the plate 87 and drive or angularly displace the plate 87. Following approximately 6¼ minutes of cumulative running time of the timing motor 72 the plate 87 is displaced to the position of Fig. 1 and to the point where additional displacement causes the spring 96 to be carried over the center of the plate. The spring 96 in moving over center snaps the plate 87 and the hammer 97 from the position of Fig. 1 to the position of Fig. 4. Thus, the hammer 97 is brought into engagement with the anvil 98 secured to the operating arm 23 whereby the operating arm 23 is driven from its "down" or downwardly biased position of Fig. 1 to its "up" or upwardly biased position of Fig. 4. In its "up" position the second operating arm 23 is effective through the insulative arm 45 for closing the contacts 46 and energizing the defrost heater 48. Additionally, movement of the second operating arm 23 to its "up" position causes the interponent 66 to position the first operating arm 5 in its "up" position against the bias of the toggle spring (not shown) tending to maintain the first operating arm 5 in its "down" position. The toggle spring 35 which biases the second operating arm 23 in either its "down" or "up" positions is stronger than the toggle spring associated with the first operating arm 5, and accordingly, the first operating arm is held in its "up" position and the refrigerating unit motor controlling contacts 11 are opened for deenergizing the unit motor 14. With the unit motor 14 deenergized and the defrost heater 48 energized, defrosting occurs. When the evaporator in the system attains a temperature of approximately 55° F. (which may be varied by manipulations of the adjustment knob 21) and turning of the adjustment screw 42 associated with the U-shaped toggle spring 35, all of the frost formed on the evaporator is melted. Also at an evaporator temperature of approximately 55° F. the bellows 17 expands sufficiently to overcome both the biasing effect of the compressed coil spring (not shown) on the pin 15 and the force exerted on the pin 15 by the toggle spring 35 through the second operating arm 23 and the interponent 66. Thus, the first operating arm 5 is moved by the toggle spring associated therewith to its "down" position for closing the contacts 11 and energizing the unit motor 14 to resume normal operation of the refrigerating system. Additionally, the interponent 66 positions the second operating arm 23 in its "down" position whereby the contacts 46 are opened and the defrost heater 48 is deenergized. In moving to the "down" position the second operating arm 23 moves over center of the toggle spring 35 and is again biased by the toggle spring 35 in its "down" position. In this manner, the defrosting operation is terminated, the unit control 2 is returned to its normal operation of maintaining the evaporator between the predetermined minimum and maximum temperatures of 5° F. and 15° F., respectively, and the defrost control 3 is reset for initiating a defrosting operation when cumulative door opening time during unit motor running time again approximates 6¼ minutes and the second operating arm 23 is driven from its "down" to its "up" position.

While I have shown and described a specific embodiment of my invention, I do not desire my invention to be limited to the particular form shown and described and I intend by the appended claims to cover all modifications within the spirit and scope of my invention.

What I claim as new and desire to secure by Letters Patent of the United States is:

1. In a refrigerator including a door operated switch, a refrigerating unit motor and a defrost heater, refrigerator controlling means comprising; a first member movable between a unit motor energizing and a unit motor deenergizing position, temperature responsive means determining the position of said first member, a second member movable between a defrost heater energizing position and a defrost heater deenergizing position, means biasing said second member in both said heater energizing and deenergizing positions, means for adjustably varying the effect of said biasing means on said second member, an interponent between said first and second members, said interponent positioning said second member in said defrost heat deenergizing position when said first member is in said unit motor energizing position, and timing means energized only when said door operated switch is closed and said unit motor is energized, said timing means being effective after a predetermined cumulative amount of running time for moving said second member from said heater deenergizing position to said heater energizing position, said interponent positioning said first member in said unit motor deenergizing position when said second member is in said heater energizing position, said first member being returned to said unit motor energizing position by said temperature responsive means at a predetermined temperature, said means biasing said second member being effective when said second member is in said heater energizing position for determining the temperature at which said first member is returned to said unit motor energizing position, adjustments to said means biasing said second member being effective for varying the temperature at which said temperature responsive means returns said first member.

2. In a refrigerator including a door operated switch, a refrigerating unit motor and a defrost heater, refrigerator controlling means comprising; a first member movable between a unit motor energizing and a unit motor deenergizing position, temperature responsive means determining the position of said first member, a second member movable between a defrost heater energizing position and a defrost heater deenergizing position, an interponent between said first and second members, said interponent positioning said second member in said defrost heater deenergizing position when said first member is in said unit motor energizing position, timing means energized only when said door operated switch is closed and said unit motor is energized, and a hammer element, said hammer element being driven by said timing means, said hammer element driving said second member from said heater deenergizing position into said heater energizing position after a predetermined cumulative amount of running time of said timing means, said interponent positioning said first member in said unit motor deenergizing position when said second member is in said heater energizing position, said first member being returned to said unit motor energizing position by said temperature responsive means at a prdetermined temperature.

3. In a refrigerator including a door operated switch, a refrigerating unit motor and a defrost heater, refrigerator controlling means comprising; a first member movable between a unit motor energizing and a unit motor deenergizing position, temperature responsive means determining the position of said first member, a second member movable between a defrost heater energizing position and a defrost heater deenergizing position, toggle means biasing said second member in both said defrost heater energizing and deenergizing positions, means for adjusting said toggle means to vary the biasing effect thereof on said second member, an interponent between said first and second members, said interponent positioning said second member in said defrost heater deenergizing position when said first member is in said unit motor energizing position, timing means energized only when said door operated switch is closed and said unit motor is energized, and a hammer element, said hammer element being driven by said timing means, said hammer element driving said second member from said heater deenergizing position to said heater energizing position after a predetermined cumulative amount of running time of said timing means, said interponent positioning said first member in said unit motor deenergizing position when said second member is in said heater energizing position, said first member being returned to said unit motor energizing position by said temperature responsive means at a predetermined temperature, said toggle means being effective when said second member is in said heater energizing position for determining the temperature at which said first member is returned to said unit motor energizing position, adjustments to said toggle means being effective for varying the temperature at which said temperature responsive means returns said first member.

4. In a refrigerator including a door operated switch, a refrigerating unit motor and a defrost heater, refrigerator controlling means comprising; a first member movable between a unit motor energizing and a unit motor deenergizing position, temperature responsive means determining the position of said first member, a second member movable between a defrost heater energizing position and a defrost heater deenergizing position, an interponent between said first and second members, said interponent positioning said second member in said defrost heater deenergizing position when said first member is in said unit motor energizing position, timing means energized only when said door operated switch is closed and said unit motor is energized, a rotatable member, said rotatable member being angularly displaced by said timing means, a hammer element carried by said rotatable member, and a spring connecting said hammer element with a point beyond the periphery of said rotatable member, said spring being carried over center of said rotatable member after a predetermined cumulative amount of running time of said timing means whereby said hammer element is snapped into engagement with said second member for driving said second member from said heater deenergizing position into said heater energizing position, said interponent positioning said first member in said unit motor deenergizing position when said second member is in said heater energizing position, said first member being returned to said unit motor energizing position by said temperature responsive means at a predetermined temperature.

5. In a refrigerator including a door operated switch, a refrigerating unit motor and a defrost heater, refrigerator controlling means comprising; a first member movable between a unit motor energizing and a unit motor deenergizing position, temperature responsive means determining the position of said first member, a second member movable between a defrost heater energizing position and a defrost heater deenergizing position, a toggle spring biasing said second member in both said defrost heater energizing and deenergizing positions, means for adjusting said toggle spring to vary the biasing effect thereof on said second member, an interponent between said first and second members, said interponent positioning said second member in said defost heater deenergizing position when said first member is in said unit motor energizing position, timing means energized only when said door operated switch is closed and said unit motor is energized, a rotatable member, said rotatable member being angularly displaced by said timing means, a hammer element carried by said rotatable member, and a spring connecting said hammer element with a point beyond the periphery of said rotatable member, said spring being carried over center of said rotatable member after a predetermined cumulative amount of running time of said timing means whereby said hammer element is snapped into engagement with said second member for driving said second member from said heater deenergizing position into said heater energizing position, said interponent positioning said first member in said unit motor deenergizing position when said second member is in said heater energizing position, said first member being returned to said unit motor energizing position by said temperature responsive means at a predetermined temperature, said toggle spring being effective when said second member is in said heater energizing position for determining the temperature at which said first member is returned to said unit motor energizing position, adjustments to said toggle spring being effective for varying the temperature at which said temperature responsive means returns said first member.

6. In a refrigerator including a door operated switch, a refrigerating unit motor and a defrost heater, refrigerator controlling means comprising; a first member movable between a unit motor energizing and a unit motor deenergizing position, temperature responsive means determining the position of said first member, a second member movable between a defrost heater energizing position and a defrost heater deenergizing position, an interponent between said first and second members, said interponent positioning said second member in said defrost heater deenergizing position when said first member is in said unit motor energizing position, a timing motor energized only when said door operated switch is closed and said unit motor is energized, a train of reduction gears driven by said timing motor, a lug carried on the ultimate gear in said train, a rotatable plate, a lug carried on said rotatable plate and disposed for engagement by said first-mentioned lug, said rotatable plate being angularly displaced by said timing motor through said reduction gears and said first and second-mentioned lugs, a hammer element carried on said plate, and a spring connecting said hammer element with a point beyond the periphery of said plate, said spring being carried over center of said plate after a predetermined cumulative amount of running time of said timing motor whereby said hammer element is snapped into engagement with said second member for driving said second member from said heater deenergizing position into said heater energizing position, said interponent positioning said first member in said unit motor deenergizing position when said second member is in said heater energizing position, said first member being returned to said unit motor energizing position by said temperature responsive means at a predetermined temperature.

7. In a refrigerator including a door operated switch, a refrigerating unit motor and a defrost heater, refrigerator controlling means comprising; a first member movable between a unit motor energizing and a unit motor deenergizing position, temperature responsive means determining the position of said first member, a second member movable between a defrost heater energizing position and a defrost heater deenergizing position, a U-shaped toggle spring having one leg thereof cooperating with said second member and biasing said second member in both said defrost heater energizing and deenergizing positions, adjusting means cooperating with the other leg of said toggle spring for varying the biasing effect of said toggle spring on said second member, an interponent between said first and second members, said interponent positioning said second member in said defrost heater deenergizing position when said first member is in said unit motor energizing position, a timing motor energized only when said door operated switch is closed and said unit motor is energized, a train of reduction gears driven by said timing motor, a lug carried on the ultimate gear in said train, a rotatable plate, a lug carried on said rotatable plate and disposed for engagement by said first-mentioned lug, said rotatable plate being angularly displaced by said timing motor through said reduction gears and said first and second-mentioned lugs, a hammer element carried on said plate, and a spring connecting said hammer element with a point beyond the periphery of said plate, said spring being carried over center of said plate after a predetermined cumulative amount of running time of said motor whereby said hammer element is snapped into engagement with said second member for driving said second member from said heater deenergizing position into said heater energizing position, said interponent positioning said first member in said unit motor deenergizing position when said second member is in said heater energizing position, said first member being returned to said unit motor energizing position by said temperature responsive means at a predetermined temperature, said toggle spring being effective when said second member is in said heater energizing position for determining the temperature at which said first member is returned to said unit motor energizing position, adjustments to said toggle spring being effective for varying the temperature at which said temperature responsive means returns said first member.

References Cited in the file of this patent

UNITED STATES PATENTS

| | | |
|---|---|---|
| 1,742,062 | Day | Dec. 31, 1929 |
| 2,064,396 | Volpin | Dec. 15, 1936 |
| 2,196,291 | Clancy | Apr. 9, 1940 |
| 2,463,027 | Frie | Mar. 1, 1949 |
| 2,583,661 | Morrison | Jan. 29, 1952 |
| 2,584,482 | McCabe | Feb. 5, 1952 |
| 2,595,967 | McCloy | May 6, 1952 |
| 2,624,180 | Grimshaw | Jan. 6, 1953 |
| 2,697,332 | Duncan | Dec. 21, 1954 |